United States Patent
Kang et al.

(10) Patent No.: US 6,814,372 B1
(45) Date of Patent: Nov. 9, 2004

(54) METHOD FOR APPARATUS FOR VENTING AN INFLATABLE RESTRAINT ASSEMBLY

(75) Inventors: Stephen Hongbin Kang, Canton, MI (US); Jeffrey Steven Vinton, Farmington Hills, MI (US); Michelle L. Tsai, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/705,218

(22) Filed: Nov. 2, 2000

Related U.S. Application Data

(60) Provisional application No. 60/163,813, filed on Nov. 5, 1999.

(51) Int. Cl.[7] .............................................. B60R 21/30
(52) U.S. Cl. ...................................... 280/740; 280/739
(58) Field of Search ................................ 280/739, 740, 280/737

(56) References Cited

U.S. PATENT DOCUMENTS

| | | | |
|---|---|---|---|
| 3,573,885 A | | 4/1971 | Brown |
| 5,184,845 A | * | 2/1993 | Omura ........................ 280/735 |
| 5,219,179 A | | 6/1993 | Eyrainer et al. |
| 5,246,250 A | | 9/1993 | Wolanin et al. |
| 5,280,953 A | | 1/1994 | Wolanin et al. |
| 5,330,226 A | | 7/1994 | Gentry et al. |
| 5,340,125 A | | 8/1994 | Brown et al. |
| 5,366,242 A | | 11/1994 | Faigle et al. |
| 5,413,378 A | * | 5/1995 | Steffens, Jr. et al. ......... 280/735 |
| 5,490,691 A | * | 2/1996 | Sinnhuber et al. .......... 280/735 |
| 5,704,639 A | | 1/1998 | Cundill et al. |
| 5,707,078 A | | 1/1998 | Swanberg et al. |
| 5,709,405 A | * | 1/1998 | Saderholm et al. ......... 280/736 |
| 5,743,558 A | | 4/1998 | Seymour |
| 5,839,755 A | | 11/1998 | Turnbull |
| 5,853,192 A | * | 12/1998 | Sikorski et al. ............ 280/739 |
| 5,918,901 A | | 7/1999 | Johnson et al. |
| 6,039,346 A | * | 3/2000 | Ryan et al. .................. 280/736 |
| 6,079,745 A | * | 6/2000 | Wier ......................... 280/806 |
| 6,123,358 A | * | 9/2000 | Ryan et al. .................. 280/739 |
| 6,161,866 A | * | 12/2000 | Ryan et al. .................. 280/736 |
| 6,199,895 B1 | * | 3/2001 | Seymour .................. 280/728.2 |
| 6,241,279 B1 | * | 6/2001 | Ochiai ........................ 280/735 |

FOREIGN PATENT DOCUMENTS

| | | |
|---|---|---|
| DE | 4306615 A1 | 9/1994 |
| JP | 404002543 A | 1/1992 |
| JP | 406286569 A | 10/1994 |

* cited by examiner

Primary Examiner—Lesley D. Morris
Assistant Examiner—L. Lum
(74) Attorney, Agent, or Firm—Gary Smith

(57) ABSTRACT

An apparatus 10 for venting an inflatable restraint assembly 12. The apparatus 10 includes a conventional pyrotechnic cylinder 30 which is communicatively coupled to a controller 28, a selectively pivotable door 32 which selectively seals and/or covers an opening 33 within assembly 12, and a latch mechanism 34 which is coupled to the cylinder 30 and which selectively engages and disengages door 32. Controller 28 is communicatively coupled to a seat position sensor 36, seat belt sensor 38 and crash severity sensor(s) 40. Controller 28 determines when a crash situation has occurred or will imminently occur and selectively activates assembly 12 if such a determination is made, thereby protecting the vehicle occupant 18 from harm and/or injury. Controller 28 further determines whether and/or when to vent air bag module 12 based upon the data received from sensors 36–40 and selectively activates cylinder 30 in response to such a determination.

15 Claims, 3 Drawing Sheets

METHOD FOR APPARATUS FOR VENTING AN INFLATABLE RESTRAINT ASSEMBLY

This application claims benefit of 60/163,813, filed Nov. 5, 1999.

FIELD OF THE INVENTION

This invention relates to a method and an apparatus for venting an inflatable restraint assembly and more particularly, to a method and an apparatus which selectively vents an inflatable restraint or "air bag" assembly at a predetermined time after inflation, based upon several factors such as occupant seat belt usage, weight, position relative to the restraint assembly, and crash severity.

BACKGROUND OF THE INVENTION

Inflatable restraint assemblies, commonly referred to as "air bags" or "curtains", are typically deployed within a vehicle and selectively and inflatably expand into the passenger compartment of the vehicle when the vehicle is struck by or collides with another vehicle or object, thereby reducing the likelihood of injury to occupants of the vehicle.

Air bag or curtain assemblies are typically and operatively coupled to a controller and/or one or more sensors which detect a vehicle collision and which activate the air bags in response to such a detection. Particularly, an air bag is typically contained within an inflator can which includes a pyrotechnic gas charge or generator which is communicatively coupled to a controller and which is selectively discharged by the controller, effective to inflate the air bag. The inflated air bag reduces the impact of an occupant of the vehicle against interior vehicle components, such as the steering wheel, dashboard and windshield.

In order to further lessen the severity of the impact and deceleration of the occupant, some air bag assemblies include pressure activated vents which selectively allow gas to be vented or released from the inflated air bag once a predetermined pressure is reached, thereby allowing the air bag to controllably deflate when impacted by the occupant. One drawback with these types of assemblies is that the pressure activated vents do not always vent or deflate the air bag at an optimal rate or time. Other air bag assemblies utilize "dual stage" inflators which are capable of discharging gas into the air bag at two separate rates or output levels. While these "dual stage" inflator type air bag assemblies may reduce occupant deceleration under certain circumstances, they do provide for optimal venting of the air bag.

There is therefore a need for a method and an apparatus for venting an inflatable restraint assembly which allows the inflatable restraint assembly to be vented at an optimal time and rate.

SUMMARY OF THE INVENTION

A first advantage of the invention is that it provides a method and an apparatus for venting an inflatable restraint assembly or air bag which overcomes at least some of the previously delineated drawbacks of the prior systems, devices, and/or methods.

A second advantage of the invention is that it provides a method and an apparatus for venting an inflatable restraint assembly which allows an air bag to be vented at an optimal rate.

A third advantage of the invention is that it provides a method and an apparatus which utilizes one or more sensors to reliably determine the optimal time to vent an air bag and to vent the air bag at that time.

According to one aspect of the present invention, an inflatable restraint assembly is provided and includes an inflator can including an aperture; an air bag which is selectively and operatively disposed within the inflator can; a pyrotechnic gas generator which is disposed within the inflator can and which is effective to selectively inflate the air bag with gas; a door which selectively covers the aperture; and an actuator which is coupled to the door and which selectively opens the door at a predetermined time after the air bag is inflated, effective to allow the gas to vent through the aperture.

According to a second aspect of the present invention, a method is provided for venting an air bag. The method includes the steps of providing an inflator can for selectively inflating the air bag; forming at least one aperture within the inflator can; selectively covering the at least one aperture with a door assembly; measuring certain vehicle attributes; and selectively uncovering the at least one aperture at a certain time after the air bag has been inflated based upon the measured certain vehicle attributes.

Further objects features, and advantages of the invention will become apparent from the following detailed description of the preferred embodiment of the invention and by reference to the following drawings.

DETAILED DESCRIPTION OF THE PREFERRED EMBODIMENT OF THE INVENTION

Figure 1:
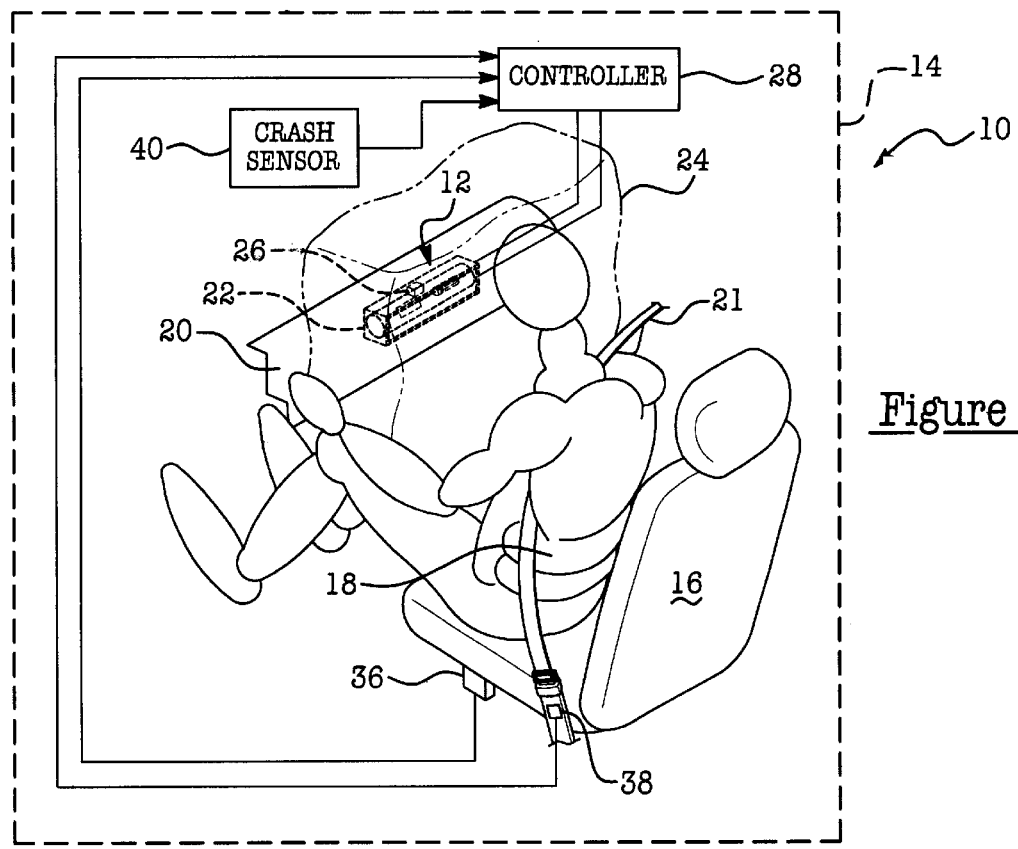
FIG. 1 is a schematic diagram illustrating an apparatus for venting an inflatable restraint assembly which incorporates the teachings of the preferred embodiment of the invention.
Figure 2:
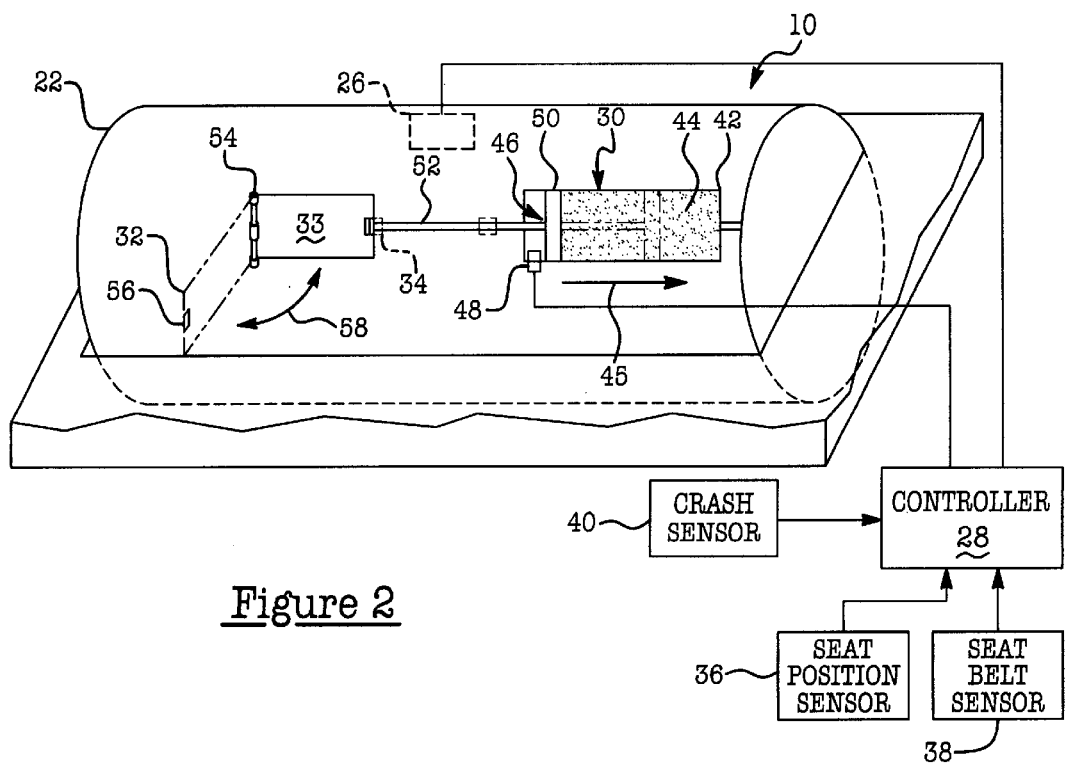
FIG. 2 illustrates the apparatus shown in FIG. 1 deployed upon an air bag inflator can or module.

Referring now to FIGS. 1 and 2, there is shown an apparatus 10 for venting an inflatable restraint assembly or air bag module 12 which is made in accordance with the teachings of the preferred embodiment of the invention. As shown, apparatus 10 is deployed within a vehicle passenger compartment 14 including a conventional seat 16 in which an occupant or passenger 18 is seated, a conventional dashboard assembly 20 which houses and/or operatively contains air bag module 12, and a conventional seat belt assembly 21. While FIG. 1 illustrates only a single apparatus 10 and air bag module 12, it should be appreciated that a substantially identical apparatus 10 may be selectively used within a driver-side air bag module or within any other suitable air bag modules (e.g., within side or rear seat air bag modules, or within rollover curtain modules) and that the following discussion is equally applicable to such modules.

Air bag module 12 includes an inflator can or housing assembly 22, a selectively inflatable air bag or curtain 24 which is selectively and operatively disposed within assembly 22, and a conventional pyrotechnic gas generator 26 which is communicatively coupled to a controller 28 and which discharges pyrotechnic gas upon receipt of an activation signal from controller 28, effective to inflate air bag 24.

As shown best in FIG. 2, apparatus 10 includes a conventional pyrotechnic cylinder or actuator 30 which is communicatively coupled (to a controller 28, a selectively pivotable door 32 which selectively seals and/or covers an opening 33 within can 22, and a latch mechanism 34 which is coupled to actuator 30 and which selectively engages and disengages door 32. In the preferred embodiment of the invention, controller 28 is communicatively coupled to a seat position sensor 36, seat belt sensor 38 and one or more crash severity sensor(s) 40. As described more fully and completely below, controller 28 determines when a crash situation has occurred or will imminently occur and selectively activates or inflates air bag 24 if such a determination is made, thereby protecting the vehicle occupant 18 from harm and/or injury. Importantly, controller 28 further determines whether and/or when to vent air bag module 12 based upon the data received from sensors 36–40 and selectively activates cylinder 30 in response to such a determination.

In the preferred embodiment, pyrotechnic cylinder 30 is operatively coupled or attached to the outside surface of inflator can 22 in a conventional manner. Cylinder 30 includes a generally cylindrical housing portion 42 which forms an interior cavity 44, a piston member 46 which is slidably disposed within cavity 44 and a pyrotechnic charge 48 which is communicatively coupled to controller 28. Piston member 46 includes a body portion 50 which resides within cavity 44 and an arm 52 which extends from cylinder 30 and which is coupled to latch mechanism 34. Charge 48 selectively fires or discharges upon receipt of a signal from controller 28, effective to cause piston 46 to move within cavity 44 in the direction of arrow 45 from a first position to a second position, which is shown in phantom in FIG. 2, thereby causing latch mechanism 34 to become disengaged from door 32. In other alternate embodiments, pyrotechnic cylinder 30 may be replaced with other types of actuators, such as a pneumatic, electromechanical or electromagnetic actuator.

Latch mechanism 34 is a conventional latch or clasp device which is effective to hold door 32 while piston 46 resides in its first position. Door 32 is a conventional door which selectively pivots about a conventional hinge 54 and which includes a conventional latch striker or engagement member 56 which is engaged by latch 34 and which cooperates with latch 34 to hold door 32 in a closed position.

Controller 28 is a restraints control module or controller which includes a conventional microprocessor, or microcontroller operating under stored program control. As should also be apparent to those of ordinary skill in the art, controller 28 may actually comprise a plurality of commercially available, conventional, and disparate chips or devices, which are operatively and communicatively linked in a cooperative manner.

Sensors 36–40 comprise a plurality of conventional and commercially available sensors which measure certain information or attributes pertaining to the vehicle. In the preferred embodiment of the invention, sensor 36 is a conventional seat track position sensor which measures the position of seat 16 and which communicates a signal to controller 28 representing the measured position. Controller 28 utilizes the received signal to determine and/or estimate the size of the occupant and/or the proximity of occupant 18 relative to the dashboard 20 and/or to other portions of the vehicle interior (e.g., the vehicle's windshield, dashboard or instrument panel). In the preferred embodiment, sensor 38 is a conventional seat belt sensor which is effective to detect when seat belt 21 is buckled, and to communicate a signal to controller 28 representing the state of seat belt 21 (i.e., buckled or unbuckled). In the preferred embodiment, sensor 40 comprises one or more vehicle crash sensors which measure vehicle acceleration/deceleration and/or other vehicle attributes which are indicative of the existence and severity of a vehicle collision (e.g., body or bumper deformation sensors), and which communicate signals to controller 28 representing these measured attributes. Controller 28 utilizes the signals received from sensors 40 in a conventional manner to determine and/or estimate the existence and severity of a vehicle collision, and to determine whether to activate air bag 24 and venting apparatus 10. In other alternate embodiments, different or additional sensors may be used to determine whether and/or when to activate apparatus 10.

In operation, when controller 28 determines that a collision has occurred or will imminently occur (e.g., by use of conventional crash detection algorithms), controller 28 determines whether the collision is severe enough to warrant deploying air bag module 12. This determination is performed by processing the signals received from sensors 40 in a conventional manner. If controller 28 determines that the collision is severe enough to warrant deploying air bag 24, controller 28 generates a signal to pyrotechnic device 26, effective to discharge the device and inflate air bag 24.

Importantly, controller 28 further determines whether and/or when apparatus 10 should be activated to vent air bag 24. Controller 28 makes this determination based upon the signals from sensors 36–40. Particularly, controller 28 considers the size of the occupant (as determined by the seat position sensor 36 and/or by other conventional sensors such as a weight sensor disposed within seat 16); whether the occupant's seat belt 21 is in a "belted" condition (as determined by sensor 38); and the severity of the crash (as determined by sensor(s) 40). In one non-limiting embodiment, controller 28 vents air bag 24 in relatively severe crashes where the occupant 18 is belted. The precise time for venting may be based upon several parameters (e.g., the severity of the collision, the size of occupant 18, the position of seat 16) and upon experimental data. Allowing the air bag 24 to vent at the appropriate time limits its stiffness to the occupant's head, thereby improving injury responses. Additionally, controller 28 refrains from venting air bag 24 in crashes where the occupant is relatively large and is not belted. Not activating the vents under these conditions has been found to better prevent the occupant 18 from contacting the vehicle's potentially harmful windshield.

When controller 28 makes a decision to vent air bag 24, it communicates a signal to pyrotechnic device 48 which causes the device 48 to discharge, thereby forcing piston 46 in the direction of arrow 45. As piston 46 moves within chamber 44, latch 34 disengages latch striker 56, and the pressure within inflator can 22 forces door 32 to pivot "open" in the direction of arrow 58. Once door 32 is in an "open" position, gas is allowed to vent from module 12 through opening 33 at a predetermined and desired rate. The size of door 32 and opening 33 determine the rate of gas venting or leaking from module 12, and may be altered based upon the structure and design of air bag module 12.

Figure 3:
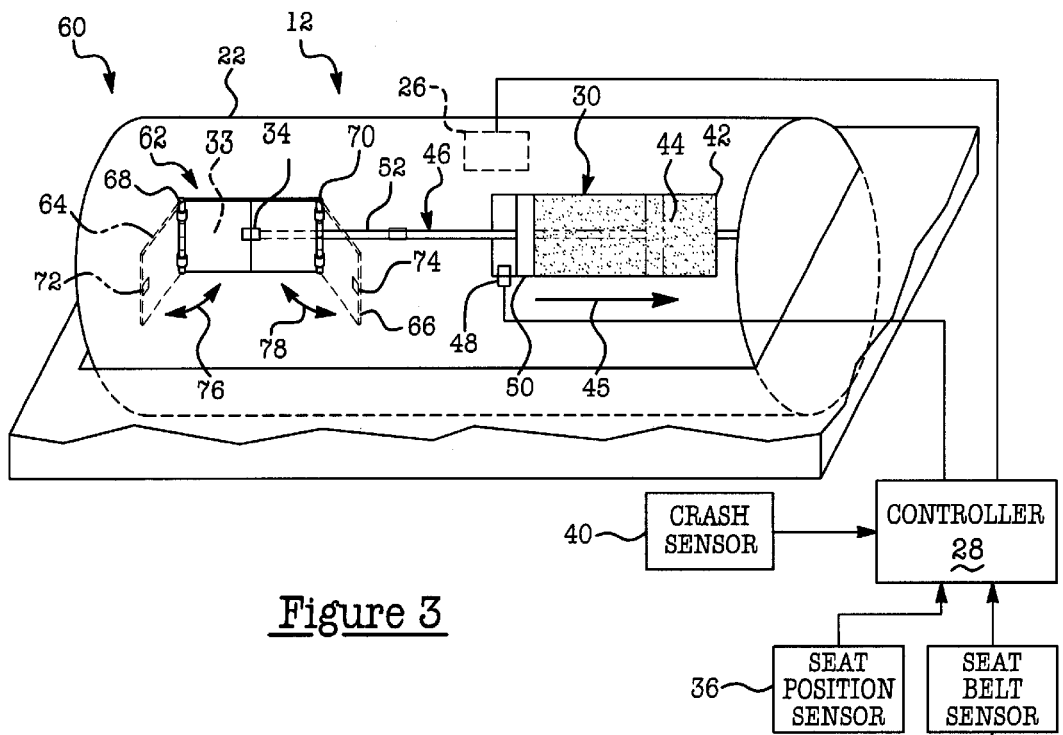
FIG. 3 illustrates an apparatus for venting an inflatable restraint assembly which incorporates the teachings of a second embodiment of the present invention.

Referring now to FIG. 3, there is shown an air bag venting apparatus 60 which is made in accordance with the teachings of a second embodiment of the present invention. Apparatus 60 is substantially similar in structure and function to apparatus 10, with the exception that door 32 has been replaced with double-door assembly 62.

In this alternate embodiment, door assembly 62 includes a pair of doors 64, 66 which are respectively and pivotably coupled to hinges 68, 70 and which selectively and cooperatively seal and cover opening 33. Doors 64, 66 respectively include conventional latch strikers or engagement members 72, 74 which are engaged by latch 34 and which cooperate with latch 34 to hold doors 64, 66 in a closed position.

In operation, when controller 28 makes a decision to vent air bag 24, it communicates a signal to pyrotechnic device 48 which causes the device 48 to discharge, thereby forcing piston 46 in the direction of arrow 45. As piston 46 moves within chamber 44, latch 34 disengages latch strikers 72, 74, and the pressure within inflator can 22 forces doors 64, 66 to pivot "open" in the direction of arrows 76, 78. Once doors 64, 66 are in an "open" position, gas is allowed to vent from module 12 through opening 33 at a predetermined and desired rate.

Figure 4:
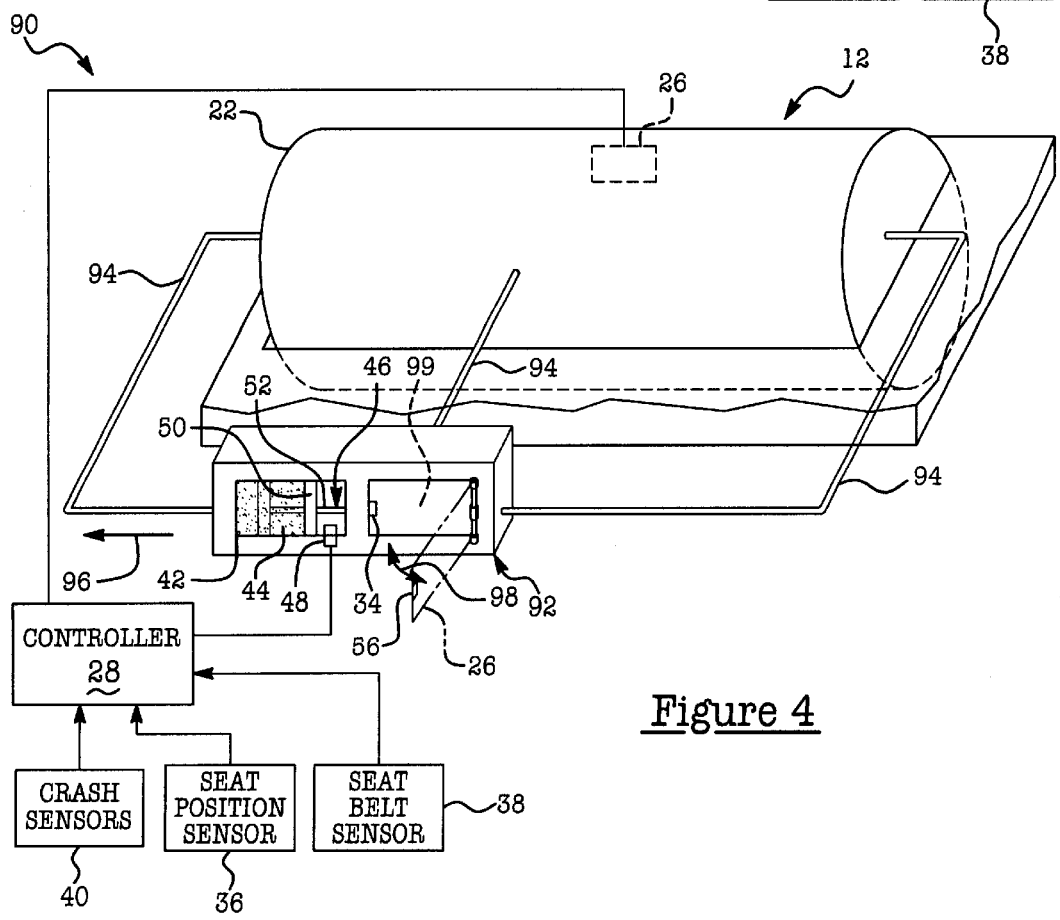
FIG. 4 illustrates an apparatus for venting an inflatable restraint assembly which incorporates the teachings of a third embodiment of the present invention.

Referring now to FIG. 4, there is shown an airbag venting apparatus 90 which is made in accordance with the teachings of a third embodiment of the present invention. Apparatus 90 is substantially similar in structure and function to apparatus 10, with the exception that door 32 and pyrotechnic cylinder 30 have been removed from inflator can 22 and have incorporated within a remote venting assembly 92 which is fluidly coupled to can 22 by use of pipes or conduits 94.

In this alternate embodiment, when controller 28 makes a decision to vent air bag 24, it communicates a signal to pyrotechnic device 48 which causes the device 48 to discharge, thereby forcing piston 46 in the direction of arrow 96. As piston 46 moves within chamber 44, piston arm 52 causes latch 34 to disengage striker 56. The pressure within inflator can 22 is communicated to assembly 92 by way of conduits 94 and forces door 26 to pivot "open" in the direction of arrow 98. Once door 26 is in an "open" position, gas is allowed to vent from module 12 through conduits 94 and opening 99 at a predetermined and desired rate.

Figure 5:
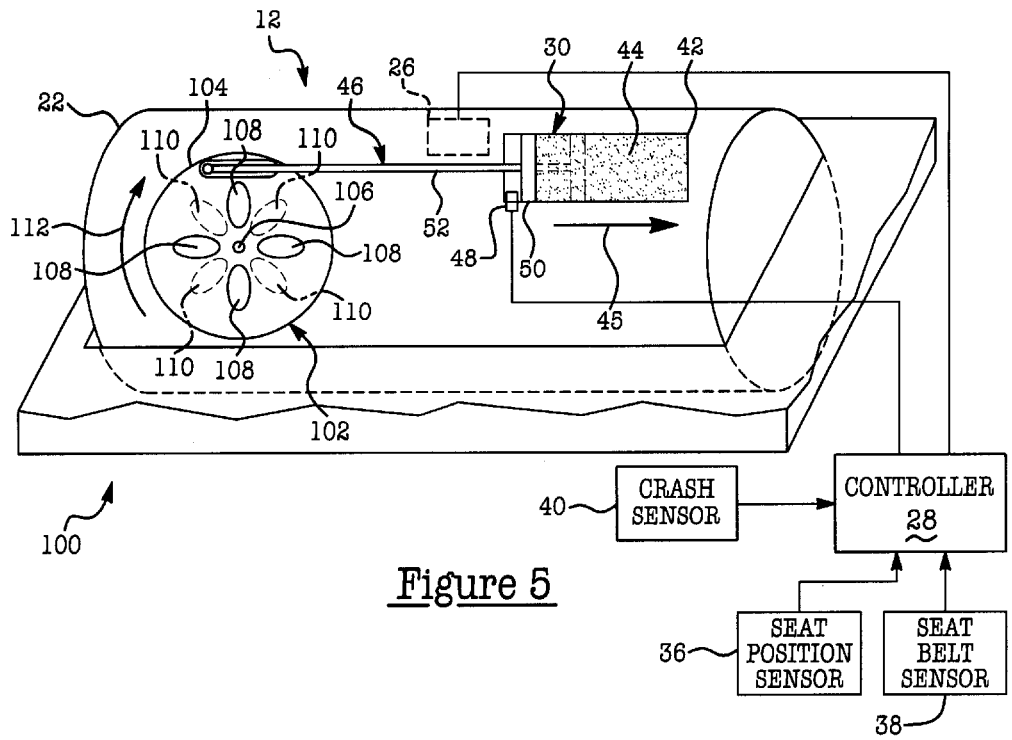
FIG. 5 illustrates an apparatus for venting an inflatable restraint assembly which incorporates the teachings of a fourth embodiment of the present invention.

Referring now to FIG. 5, there is shown an airbag venting apparatus 100 which is made in accordance with the teachings of a fourth embodiment of the present invention. Apparatus 100 is substantially similar in structure and function to apparatus 10, with the exception that door 32 has been replaced with a rotatable venting assembly 102.

In this alternate embodiment, rotatable venting assembly 102 comprises a disc 104 which is rotatably coupled to can 22 by use of a conventional dowel or pin member 106. Disc 104 includes several oval-shaped apertures 108, which correspond with several apertures 110 which are formed within can 22. When disc 104 is in a "closed" position, it covers and/or seals apertures 110 and when disc 104 is in an "open" position, apertures 108 are aligned with apertures 110, thereby allowing gas to escape from module 12. Disc 104 is coupled to piston arm 52 in a conventional manner.

In operation, when controller 28 makes a decision to vent air bag 24, it communicates a signal to pyrotechnic device 48 which causes the device 48 to discharge, thereby forcing piston 46 in the direction of arrow 45. As piston 46 moves within chamber 44, piston arm 52 pulls or forces disc 104 in the direction of arrow 45, thereby causing disc 104 to rotate in the direction of arrow 112 from its "closed" position to its "open" position. Once disc 104 is in an "open" position, gas is allowed to vent from module 12 through openings 110 at a predetermined and desired rate.

Figure 6:
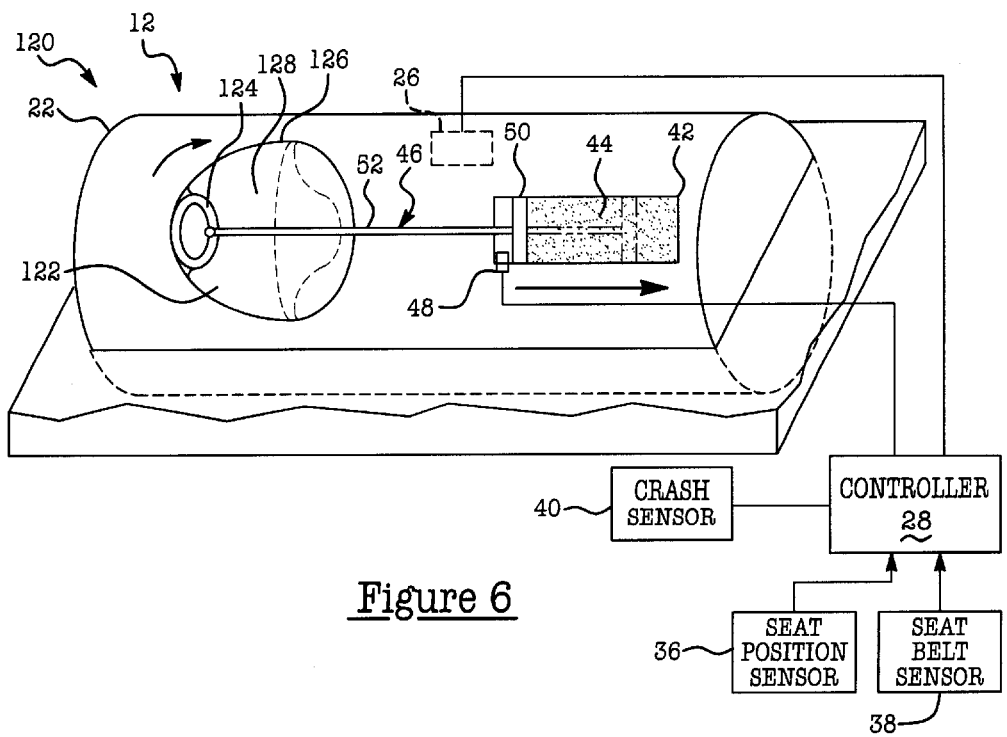
FIG. 6 illustrates an apparatus for venting an inflatable restraint assembly which incorporates the teachings of a fifth embodiment of the present invention.

Referring now to FIG. 6, there is shown an airbag venting apparatus 120 which is made in accordance with the teachings of a fifth embodiment of the present invention. Apparatus 120 is substantially similar in structure and function to apparatus 10, with the exception that door 32 has been replaced with a retractable door 122 which seals and/or covers aperture 128.

In this alternate embodiment, retractable door 122 is attached to can 22 in a conventional manner. Particularly, door 122 has been welded or otherwise adhered to the outer surface of can 22 along border 126. Door 122 includes an integrally formed ring or tab 124 which is coupled to piston arm 52 in a conventional manner.

In operation, when controller 28 makes a decision to vent air bag 24, it communicates a signal to pyrotechnic device 48 which causes the device 48 to discharge, thereby forcing piston 46 in the direction of arrow 45. As piston 46 moves within chamber 44, piston arm 52 retracts or "curls" door 122 into an "open" position (shown in phantom in FIG. 6). Once door 112 is in an "open" position, gas is allowed to vent from module 12 through opening 128 at a predetermined and desired rate.

It is understood that the various inventions are not limited to the exact construction illustrated and described above, but that these previously delineated inventions may be varied without departing from the scope of the inventions as described in the following claims.

What is claimed is:

1. An inflatable restraint assembly comprising:
   an inflator can including an aperture;
   an air bag which is selectively and operatively disposed within said inflator can;
   a pyrotechnic gas generator which is disposed within said inflator can and which is effective to selectively inflate said air bag with gas;
   a door assembly which selectively covers said aperture;
   an actuator comprising a pyrotechnic cylinder and a piston assembly which is coupled to said door assembly and which selectively opens said door assembly at a predetermined time after said air bag is inflated, effective to allow said gas to vent through said aperture; and
   a controller which is communicatively coupled to said pyrotechnic gas generator and to said actuator which is effective to selectively activate said pyrotechnic gas generator and said actuator to vent said inflated air bag only after said air bag is fully inflated.

2. The inflatable restraint assembly of claim 1 further comprising:
   a crash severity sensor which is communicatively coupled to said controller; and
   wherein said controller utilizes said crash severity sensor to estimate crash severity and to selectively activate said pyrotechnic gas generator and said actuator based upon said estimated crash severity.

3. The inflatable restraint assembly of claim 2 further comprising:
   a seat belt sensor which is communicatively coupled to said controller; and
   wherein said controller utilizes said seat belt sensor to determine whether a seat belt is buckled and to selectively activate said actuator if said seat belt is buckled.

4. The inflatable restraint assembly of claim 3 further comprising:

a seat position sensor which is communicatively coupled to said controller;

wherein said controller utilizes said seat position sensor to determine a seat position and to selectively activate said actuator based upon said determination.

5. The inflatable restraint assembly of claim 1 wherein said door assembly comprises a pivoting door.

6. The inflatable restraint assembly of claim 1 wherein said door assembly comprises a double door assembly.

7. The inflatable restraint assembly of claim 1 wherein said door assembly comprises a retractable door.

8. The inflatable restraint assembly of claim 1 wherein said door assembly comprises a rotating door.

9. An apparatus for venting an air bag, said apparatus comprising:

an inflator can which operatively holds said air bag and which includes an aperature;

a door assembly which is coupled to said inflator can and which selectively covers said aperature; and a pyrotechnic cylinder comprising a piston assembly including an arm which selectively latches and unlatches said door assembly, thereby allowing said door assembly to selectively move from a closed position to an open position, wherein said arm is coupled to said door assembly and which is effective to selectively allow said door assembly to open after said air bag is inflated, thereby venting said inflated air bag;

a plurality of sensors which measure certain vehicle attributes and which generate signals representing said measured attributes; and a controller which is communicatively coupled to said plurality of sensors and to said pyrotechnic cylinder, said controller being effective to receive said signals and to selectively activate said pyrotechnic cylinder only after said air bag is fully inflated by said inflator can, wherein said selective activation of said pyrotechnic cylinder is based upon said received signals, thereby allowing said door assembly to open and venting said air bag.

10. The apparatus of claim 9 wherein said plurality of sensors comprise a seat belt sensor, a crash severity sensor and a seat position sensor.

11. A method for venting an airs bag, said method comprising the steps of:

providing an inflator can for selectively inflating said air bag;

forming at least one aperture within said inflator can;

selectively covering said at least one aperture with a door assembly;

measuring certain vehicle attributes; and selectively uncovering said at least one aperture only after said air bag has been fully inflated by said inflator can, wherein said selective uncovering of said at least one aperature is based upon said measured certain vehicle attributes and is performed by attaching a pyrotechnic cylinder and a slidable piston assembly to said door assembly and by selectively activating said pyrotechnic cylinder only after said air bag is fully inflated to move said slidable piston.

12. The method of claim 11 wherein said certain vehicle attributes comprise a passenger size.

13. The method of claim 12 wherein said certain vehicle attributes further comprise a seat belt state.

14. The method of claim 13 wherein said certain vehicle attributes further comprise a seat position.

15. The method of claim 14 wherein said certain vehicle attributes further comprise a crash severity.

* * * * *